United States Patent
Lin (10) Patent No.: US 10,282,578 B2
(45) Date of Patent: May 7, 2019

(54) ARRAY SENSOR AND SENSING METHOD THEREOF

(71) Applicant: Egis Technology Inc., Taipei (TW)

(72) Inventor: Todd Lin, Taipei (TW)

(73) Assignee: Egis Technology Inc., Taipei (TW)

( * ) Notice: Subject to any disclaimer, the term of this patent is extended or adjusted under 35 U.S.C. 154(b) by 56 days.

(21) Appl. No.: 15/077,826

(22) Filed: Mar. 22, 2016

(65) Prior Publication Data

US 2017/0083749 A1  Mar. 23, 2017

(30) Foreign Application Priority Data

Sep. 22, 2015  (CN) .......................... 2015 1 0607007

(51) Int. Cl.
*G06K 9/00* (2006.01)

(52) U.S. Cl.
CPC ................. *G06K 9/00013* (2013.01)

(58) Field of Classification Search
USPC ....... 234/662; 235/380, 435; 340/5.53, 5.83; 345/173, 179; 348/247; 382/115, 124; 600/509
See application file for complete search history.

(56) References Cited

U.S. PATENT DOCUMENTS

| | | | | |
|---|---|---|---|---|
| 5,515,738 A * | 5/1996 | Tamori | ...................... | G01L 1/16 310/338 |
| 5,956,415 A * | 9/1999 | McCalley | ................ | G06F 3/044 340/5.83 |
| 5,963,679 A * | 10/1999 | Setlak | .................. | G06K 9/0002 382/115 |
| 6,442,286 B1 * | 8/2002 | Kramer | ................ | G06K 9/0002 382/124 |
| 6,611,614 B1 * | 8/2003 | Jung | .................. | G06K 9/00067 340/5.53 |
| 6,671,392 B1 * | 12/2003 | Shigematsu | ....... | G06K 9/00006 382/124 |
| 6,760,068 B2 * | 7/2004 | Petropoulos | ........... | H04N 5/367 348/247 |
| 6,906,529 B2 * | 6/2005 | Blanchard | ............ | G01D 5/2405 324/662 |
| 6,917,694 B1 * | 7/2005 | Machida | ............ | G06K 9/00006 340/5.53 |

(Continued)

FOREIGN PATENT DOCUMENTS

| | | |
|---|---|---|
| CN | 1906459 | 1/2007 |
| CN | 103955679 | 7/2014 |
| TW | 541503 | 7/2003 |

OTHER PUBLICATIONS

"Office Action of China Counterpart Application", dated Nov. 30, 2018, p. 1-p. 6.

*Primary Examiner* — Xuemei G Chen
(74) *Attorney, Agent, or Firm* — JCIPRNET (57) ABSTRACT

An array sensor is provided. The array sensor includes a sensing array, a memory array, and an access module. The sensing array includes a plurality of sensing units, wherein each of the sensing units includes a sensing electrode. The memory array includes a plurality of memory units, wherein each of the memory units is disposed below the corresponding sensing unit or between the two adjacent sensing units. The access module selectively reads a sensing value of the sensing electrode of the sensing unit to provide a sensing output, or accesses the memory unit.

18 Claims, 6 Drawing Sheets

(56) References Cited

U.S. PATENT DOCUMENTS

| | | | | |
|---|---|---|---|---|
| 7,606,399 | B2* | 10/2009 | Morimura | A61B 5/1172 340/5.83 |
| 8,447,077 | B2* | 5/2013 | Benkley | G06T 7/248 382/124 |
| 9,460,331 | B2* | 10/2016 | Du | G06K 9/00033 |
| 9,612,691 | B2* | 4/2017 | Chen | G06F 3/044 |
| 9,618,405 | B2* | 4/2017 | Liu | G01L 1/165 |
| 9,697,410 | B2* | 7/2017 | Lo | G06K 9/0002 |
| 9,779,280 | B2* | 10/2017 | Benkley, III | G06K 9/00033 |
| 9,817,506 | B2* | 11/2017 | Shen | G06F 3/0416 |
| 9,892,305 | B2* | 2/2018 | Lee | G06K 9/00026 |
| 2002/0090117 | A1 | 7/2002 | Kramer | |
| 2002/0164057 | A1* | 11/2002 | Kramer | G06K 9/00067 382/124 |
| 2003/0108226 | A1* | 6/2003 | Goodman | G06K 9/0002 382/124 |
| 2004/0125990 | A1* | 7/2004 | Goodman | G06K 9/0002 382/115 |
| 2005/0150947 | A1* | 7/2005 | Goodman | G06K 9/0002 235/380 |
| 2005/0210988 | A1* | 9/2005 | Amano | H01L 27/20 73/704 |
| 2007/0075138 | A1* | 4/2007 | Ross | G06K 9/00885 235/435 |
| 2010/0079397 | A1* | 4/2010 | Yang | G06F 3/0416 345/173 |
| 2010/0113952 | A1* | 5/2010 | Raguin | G06K 9/0012 600/509 |
| 2011/0007035 | A1* | 1/2011 | Shai | G06F 3/014 345/179 |
| 2014/0266262 | A1* | 9/2014 | Taghibakhsh | G06K 9/0002 324/686 |
| 2014/0333328 | A1* | 11/2014 | Nelson | G06F 3/044 324/663 |
| 2016/0055363 | A1* | 2/2016 | Lee | G06K 9/0002 382/124 |
| 2016/0063301 | A1* | 3/2016 | Wu | G06K 9/00033 382/124 |
| 2016/0092713 | A1* | 3/2016 | Wu | G06K 9/0002 382/124 |
| 2016/0227142 | A1* | 8/2016 | Lin | G06K 9/0002 |
| 2016/0292489 | A1* | 10/2016 | Lin | G06K 9/0002 |
| 2016/0307021 | A1* | 10/2016 | Kim | G06K 9/0002 |

* cited by examiner

ARRAY SENSOR AND SENSING METHOD THEREOF

CROSS REFERENCE TO RELATED APPLICATIONS

This Application claims priority of China Patent Application No. 201510607007.4, filed on Sep. 22, 2015, the entirety of which is incorporated by reference herein.

BACKGROUND OF THE INVENTION

Field of the Invention

The invention relates to an array sensor, and more particularly to a memory architecture of an array sensor.

Description of the Related Art

In recent years, biological identification technology has become increasingly mature, and different biological features can be used for identifying users. Since the recognition rate and accuracy of fingerprint identification technology are better than those of other biological feature identification technologies, fingerprint identification and verification is used extensively in various areas.

Fingerprint identification and verification technology detects a user's fingerprint pattern by using an array sensor, captures specific fingerprint data from the fingerprint pattern and saves the fingerprint data into the memory or directly stores the fingerprint pattern. Thereafter, when the user presses or swipes a finger on or over the fingerprint sensor again, the fingerprint sensor senses the fingerprint pattern and captures fingerprint data, so as to compare with the previously stored fingerprint data, or directly compares with the previously stored fingerprint pattern for identification. If the two match, then the user's identity is confirmed.

Figure 1:
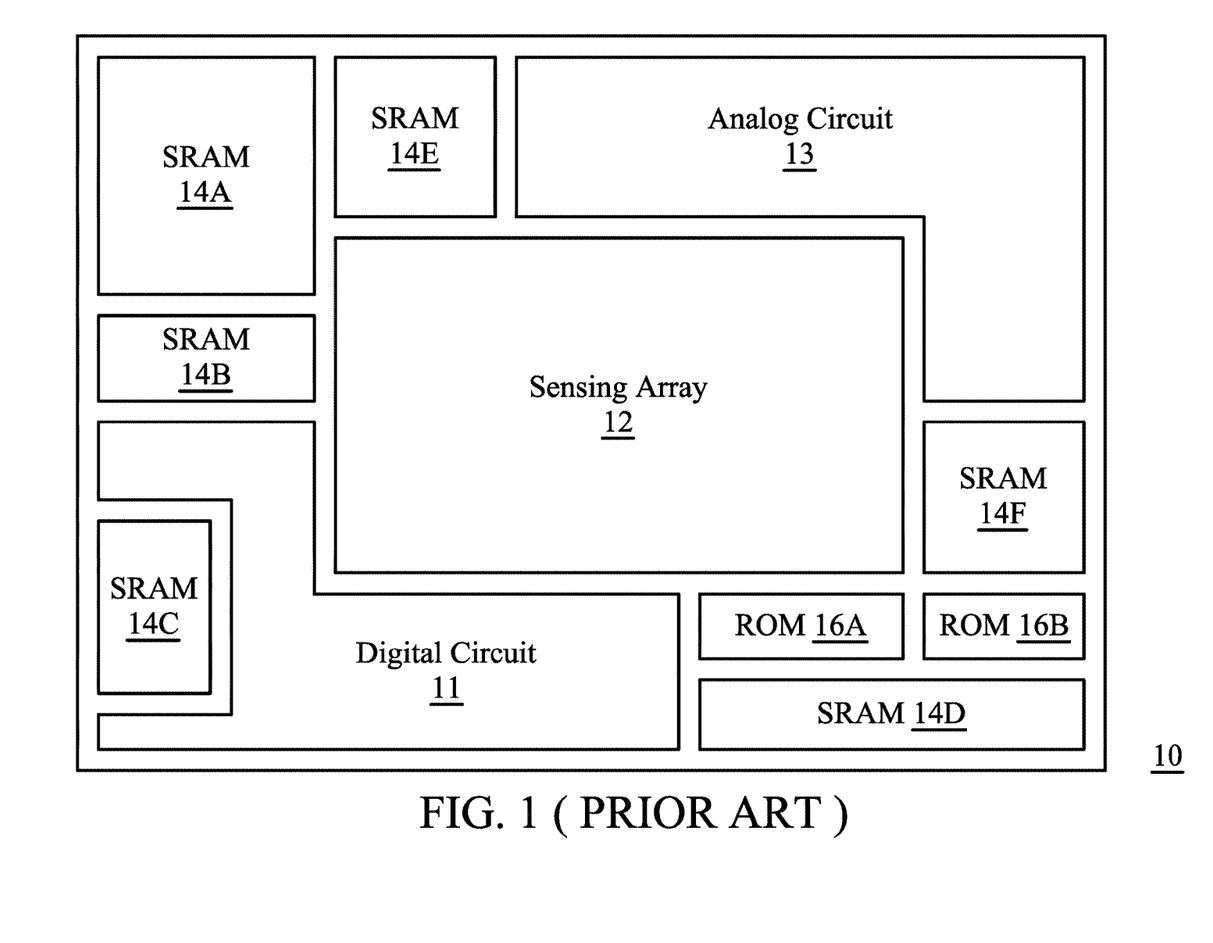
FIG. 1 shows a layout schematic illustrating a conventional sensing chip disposed in an array sensor.

FIG. 1 shows a layout schematic illustrating a conventional sensing chip 10 disposed in an array sensor. The sensing chip 10 comprises a digital circuit 11, a sensing array 12, an analog circuit 13 and a plurality of memories, wherein the memories comprise the static random access memories (SRAMs) 14A-14F and the read only memories (ROMs) 16A-16B. In FIG. 1, the SRAMs 14A-14F and the ROMs 16A-16B are disposed around the sensing array 12. Therefore, when the amount of the memories that the sensing chip 10 needs to perform operations increases, the layout area of the sensing chip 10 is increased. Furthermore, for the related signals and the logic units in the digital circuit 11 capable of accessing various regions of the memories, setup/hold time violations will easily occur in the layout, thereby increasing the difficulty of the layout. In design processes of an integrated circuit, additional time and efforts are needed to solve these time violations.

BRIEF SUMMARY OF THE INVENTION

An array sensor and sensing method thereof are provided. An embodiment of an array sensor is provided. The array sensor comprises a sensing array, a memory array, and an access module. The sensing array comprises a plurality of sensing units, wherein each of the sensing units comprises a sensing electrode. The memory array comprises a plurality of memory units, wherein each of the memory units is disposed below the corresponding sensing unit or between the two adjacent sensing units. The access module selectively reads a sensing value of the sensing electrode of the sensing unit to provide a sensing output, or accesses the memory unit.

Furthermore, an embodiment of a sensing method for an array sensor is provided, wherein the array sensor comprises a sensing array comprising a plurality of sensing units and a memory array comprising a plurality of memory units. According to an addressing signal, the sensing array is read to provide a sensing output, or the memory array is accessed. Each of the sensing unit comprises a sensing electrode, and each of the memory units is disposed below the corresponding sensing unit or between the two adjacent sensing units.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

When a user presses or swipes his or her finger on or over a fingerprint sensor, the fingerprint sensor will detect and obtain different capacitance values corresponding to the fingerprint ridges and fingerprint valleys. Next, voltage values corresponding to the capacitance values are obtained by using a charge-sharing technique, and the voltage value is input to an analog-to-digital converter (ADC) for converting the voltage value into a digital code. The digital code is provided to a processor for subsequent operation and fingerprint identification.

Figure 2:
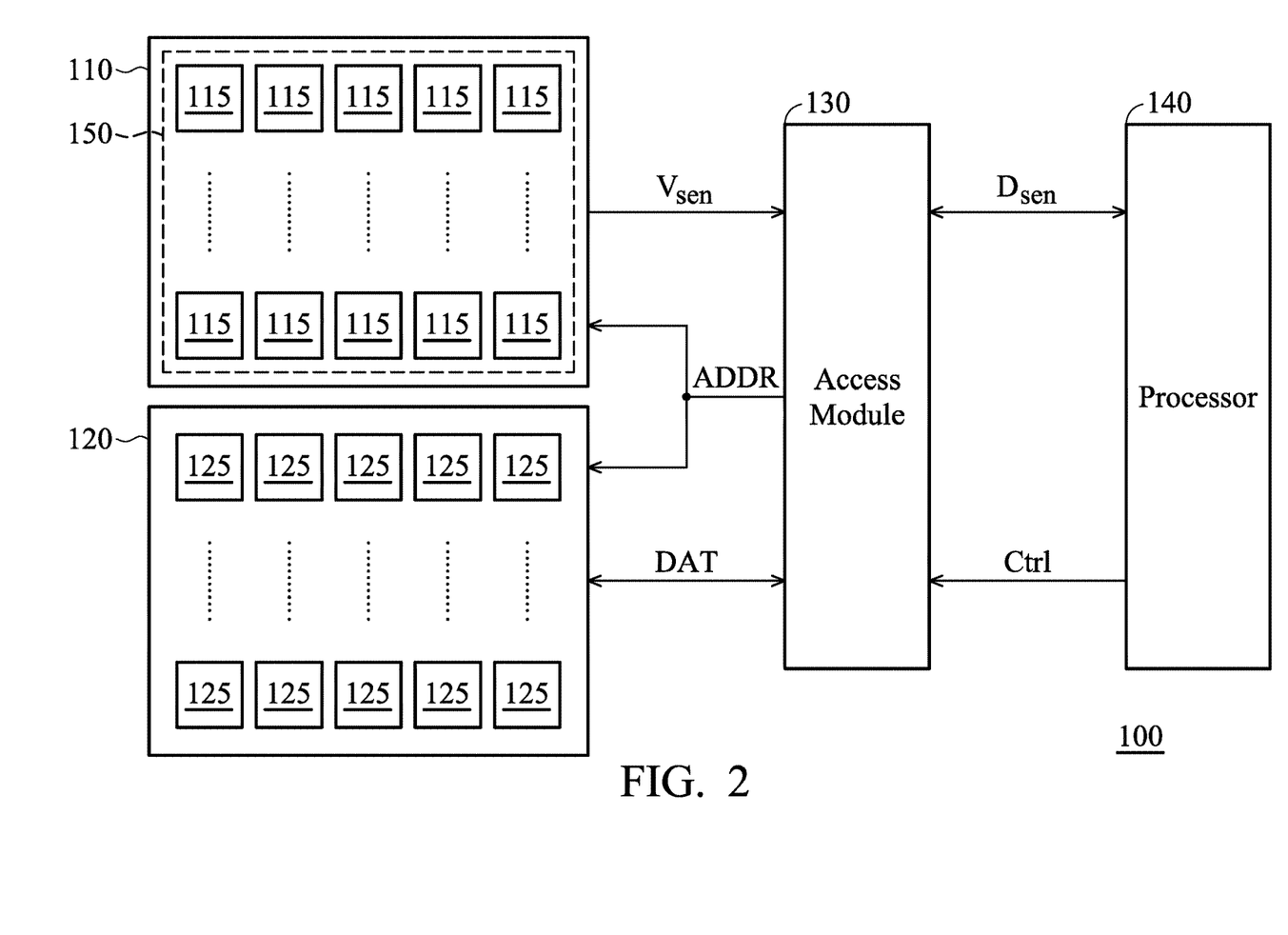
FIG. 2 shows a fingerprint sensor according to an embodiment of the invention.

FIG. 2 shows a fingerprint sensor 100 according to an embodiment of the invention. The fingerprint sensor 100 comprises a sensing array 110, a memory array 120, an access module 130, a processor 140 and an insulating surface 150. In the embodiment, the sensing array 110, the memory array 120, the access module 130 and the processor 140 are implemented in a semiconductor substrate. The sensing array 110 is formed by a plurality of sensing units 115 arranged in a two-dimensional manner. The insulating surface 150 is disposed on the semiconductor substrate, and overlays the whole sensing units 115 of the sensing array 110. The memory array 120 comprises a plurality of memory units 125, wherein the memory array 120 is disposed below the sensing array 110 in layout, and each memory unit 125 is disposed below a corresponding sensing unit 115. In one embodiment, each memory unit 125 is capable of storing the data related to the corresponding sensing unit 115. According to an addressing signal ADDR, the access module 130 can selectively read the sensing array 110 and the memory array 120. For example, according to a control signal Ctrl from the processor 140, the access module 130 can generate the addressing signal ADDR, so as to address the sensing unit 115 of the sensing array 110. Thus, the access module 130 obtains a sensing voltage $V_{sen}$ of the addressed sensing unit 115, and provides a sensing output $D_{sen}$ to the processor 140 according to the sensing voltage $V_{sen}$. Next, the processor 140 determines whether a finger of a user contacts the insulating surface 150 according to the received sensing outputs $D_{sen}$, and further obtains fingerprint information of the finger, so as to determine that the sensing output $D_{sen}$ corresponds to a fingerprint ridge or a fingerprint valley of the finger. Thus, according to the sensing outputs $D_{sen}$ corresponding to the sensing voltage $V_{sen}$ of the 110, the processor 140 obtains the binary or gray-level fingerprint data for subsequent processing, for example, a fingerprint identification operation is performed by a fingerprint identification algorithm. In FIG. 2, the processor 140 also stores the fingerprint information sensed by the sensing unit 115 into the corresponding memory unit 125 of the memory array 120 via the access module 130. For example, in one embodiment, the processor 140 provides the control signal Ctrl to the access module 130, so as to control the access module 130 to store the sensing output $D_{sen}$ corresponding to the sensing voltage $V_{sen}$ of the sensing unit 115 into the memory unit 125 of the memory array 120 corresponding to the sensing unit 115. Specifically, the data DAT stored in the memory unit 125 of the memory array 120 is the sensing output $D_{sen}$ of the corresponding sensing unit 115 of the sensing array 110. Furthermore, in another embodiment of the invention, the data DAT stored in the memory array 120 is an error value Err of the sensing unit 115 in the sensing array 110, wherein the error value Err represents the sensing voltage $V_{sen}$ of the sensing unit 115 that is obtained by the access module 130 when no object contacts the insulating surface 150. Therefore, after obtaining the sensing output $D_{sen}$ of the sensing unit 115, the processor 140 can obtain the data DAT (i.e. the error value Err) corresponding to the sensing unit 115 from the memory array 120 via the access module 130. Thus, when the insulating surface 150 is dirty or damaged, the processor 140 can obtain the fingerprint information of the finger according to the current sensing voltages $V_{sen}$ and the error values Err stored in the memory array 120. For example, the corrected sensing voltage is obtained by subtracting the error value Err from the current sensing voltage $V_{sen}$. Furthermore, the fingerprint sensor 100 can perform a self-calibration procedure according to the error values Err. In another embodiment, the processor 140 is implemented outside the fingerprint sensor 100.

Figure 3:
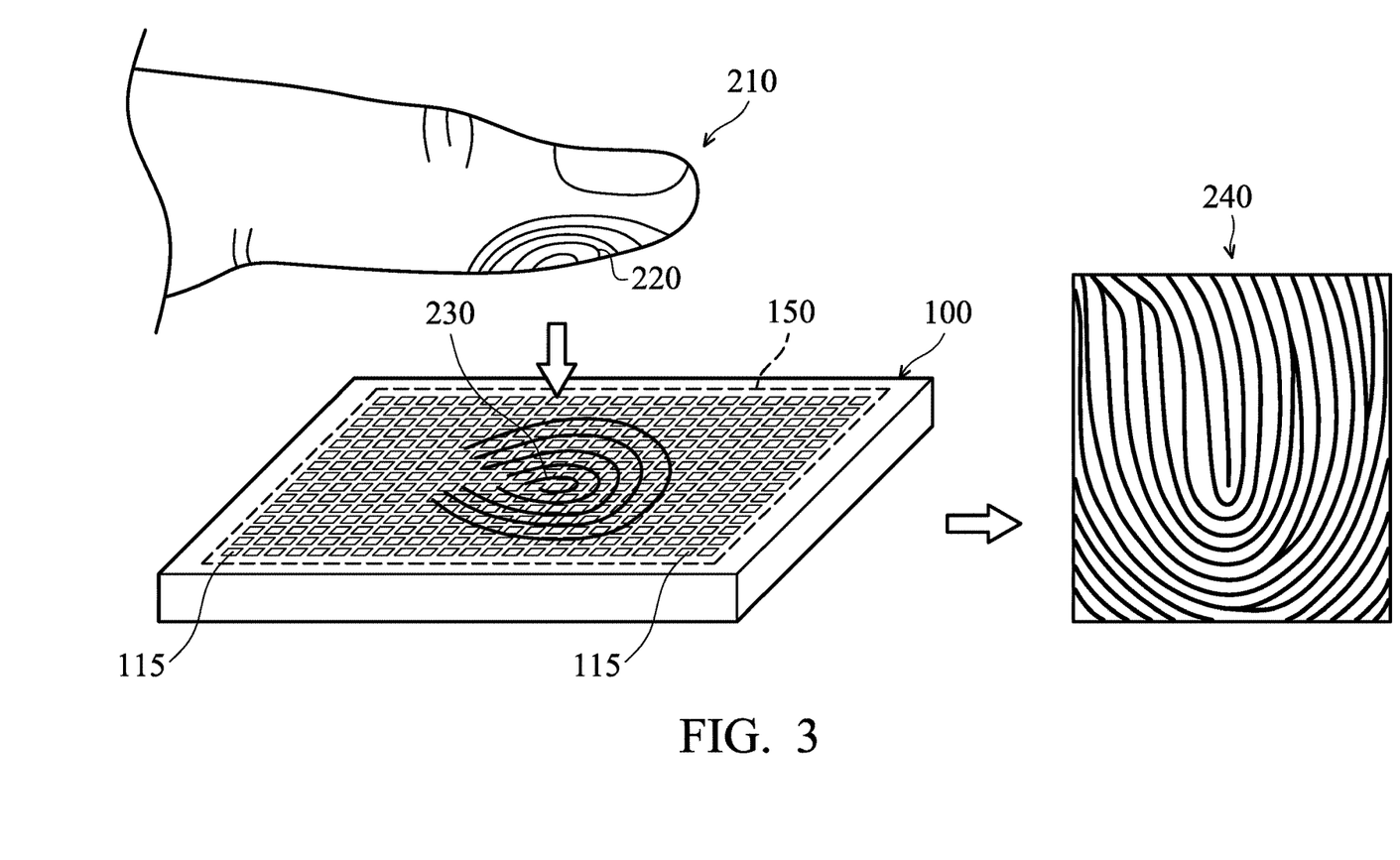
FIG. 3 shows a schematic diagram illustrating that the fingerprint sensor of FIG. 2 is used to obtain the fingerprint of the user.

FIG. 3 shows a schematic diagram illustrating that the fingerprint sensor 100 of FIG. 2 is used to obtain the fingerprint of the user. In FIG. 3, when the finger 210 contacts the fingerprint sensor 100, the fingerprint ridges 220 on the surface of the finger 210 will contact and press the sensing units 115 via the insulating surface 150. Thus, the fingerprint sensor 100 obtains a capacitance curve 230 corresponding to the fingerprint ridges 220, and identifies the shape of the fingerprint ridges 220 according to the shape of the capacitance curve 230, so as to obtain a fingerprint pattern 240. Next, the other circuits or devices can perform subsequent processes according to the fingerprint pattern 240.

Figure 4A:
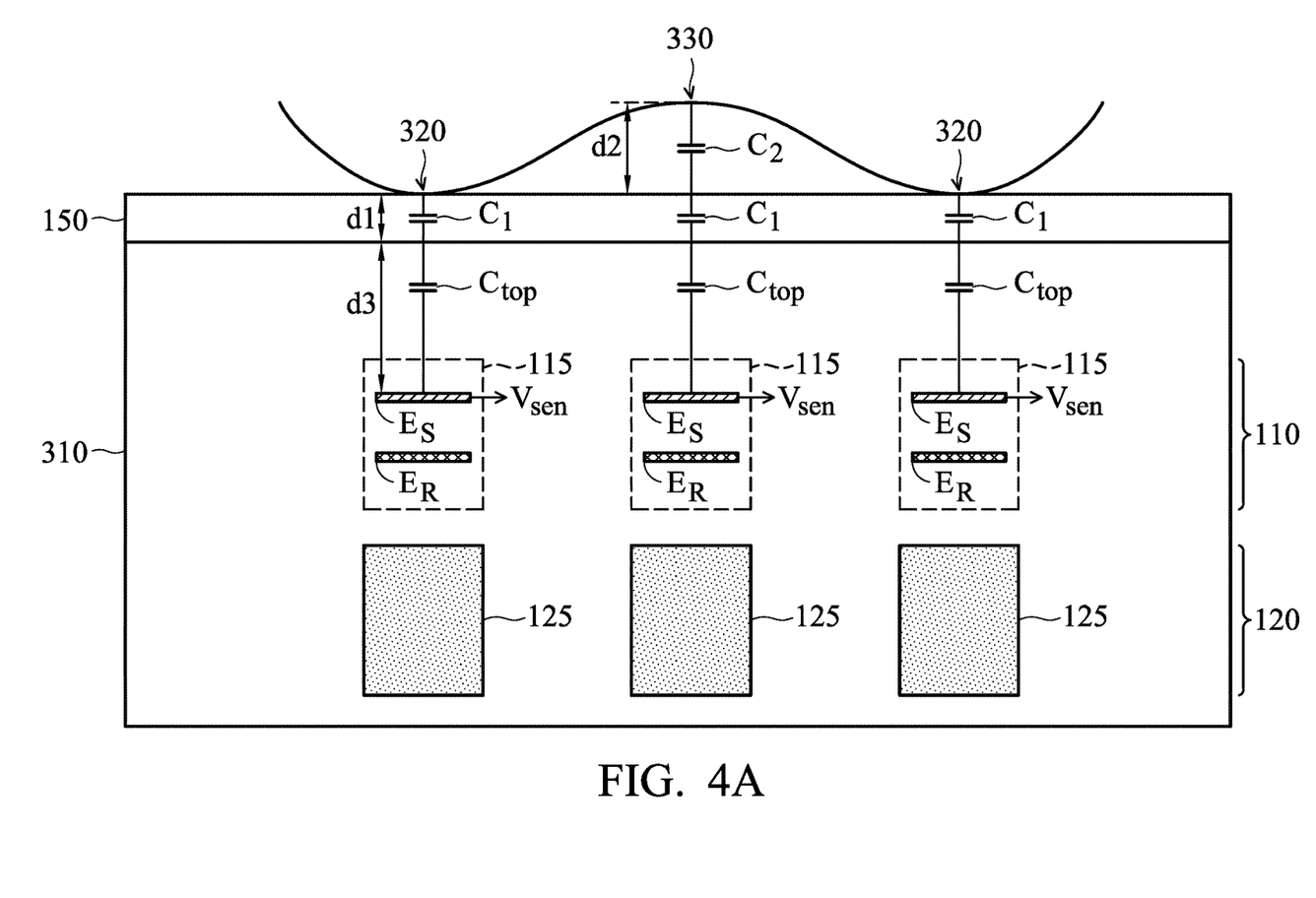
FIG. 4A shows an example of a sectional schematic illustrating the finger of the user contacting the fingerprint sensor of FIG. 2.

FIG. 4A shows an example of a sectional schematic illustrating the finger of the user contacting the fingerprint sensor 100 of FIG. 2. In FIG. 4A, the insulating surface 150 is disposed on the semiconductor substrate 310. In general, the insulating surface 150 is a protective dielectric layer formed by performing the integrated circuit manufacturing process. The thickness of the insulating surface 150 is d1, wherein an equivalent capacitor $C_1$ of the insulating surface 150 is determined by the thickness d1. Label 320 represents a fingerprint ridge of the finger, wherein the fingerprint ridge 320 of the finger will directly contact the insulating surface 150. Moreover, Label 330 represents a fingerprint valley of the finger, wherein a distance between the fingerprint valley 330 of finger and the insulating surface 150 is d2, and a capacitor $C_2$ between the fingerprint valley 330 and insulating surface 150 is determined by the distance d2. As described above, the sensing array 110 is formed by a plurality of sensing units 115. In the embodiment, each sensing unit 115 comprises a sensing electrode $E_S$ and a reference electrode $E_R$, wherein the sensing electrode $E_S$ and the reference electrode $E_R$ are formed by different metal layers within the semiconductor substrate 310. For example, the sensing electrode $E_S$ is formed by a top metal layer and is disposed below the insulating surface 150, and the reference electrode $E_R$ is disposed below the sensing electrode $E_S$, wherein the reference electrode $E_R$ is coupled to a ground GND or other reference voltage. It should be noted that the structure of the sensing unit 115 of FIG. 4A is an example and is not meant to limit the invention. In one embodiment, the sensing unit 115 only comprises the sensing electrode $E_S$. In other embodiments, the sensing unit 115 comprises the sensing electrode $E_S$ and a thin-film transistor (TFT). In FIG. 4A, the thickness of an insulation layer between the insulating surface 150 and the sensing electrode $E_S$ is d3, wherein an equivalent capacitor $C_{top}$ on the insulation layer is determined according to the thickness d3. Therefore, when the fingerprint ridge 320 contacts the insulating surface 150, a sensing capacitor $C_{sen}$ between the fingerprint ridge 320 and the sensing electrode $E_S$ is formed by the capacitor $C_{top}$ and the capacitor $C_1$ connected in series. Furthermore, compared with the sensing capacitor $C_{sen}$ of the fingerprint ridge 320, a sensing capacitor $C_{sen}$ between the fingerprint valley 330 and the sensing electrode $E_S$ is formed by the capacitor $C_{top}$, the capacitor $C_1$ and the capacitor $C_2$ connected in series. Thus, when the finger contacts the insulating surface 150, the fingerprint ridge 320 and the fingerprint valley 330 will cause the capacitance of each to be different. Thus, the readout module 130 of FIG. 2 can obtain the sensing voltage $V_{sen}$ corresponding to the sensing capacitor $C_{sen}$ via the sensing electrode $E_S$. When no object contacts the insulating surface 150, the readout module 130 also obtains the sensing voltage $V_{sen}$ via the sensing electrode $E_S$. When the insulating surface 150 is dirty or damaged, the sensing voltage $V_{sen}$ of the sensing unit disposed below the dirty or damaged region is different from the sensing voltages $V_{sen}$ of the other sensing units. Therefore, when no object contacts the insulating surface 150, the processor 140 will respectively set the sensing voltage $V_{sen}$ of each sensing unit as an error value or a factory preset value of the sensing unit 115, and store the sensing voltage $V_{sen}$ into the corresponding memory unit 125 of the memory array 120, i.e. the memory unit 125 disposed below the sensing unit 115. Thus, when the finger is placed on the sensing array 110, the processor 140 can generate the fingerprint information according to the current sensing voltages $V_{sen}$ sensed by the sensing units 115 and the error values Err stored in the corresponding memory units 125.

Figure 4B:
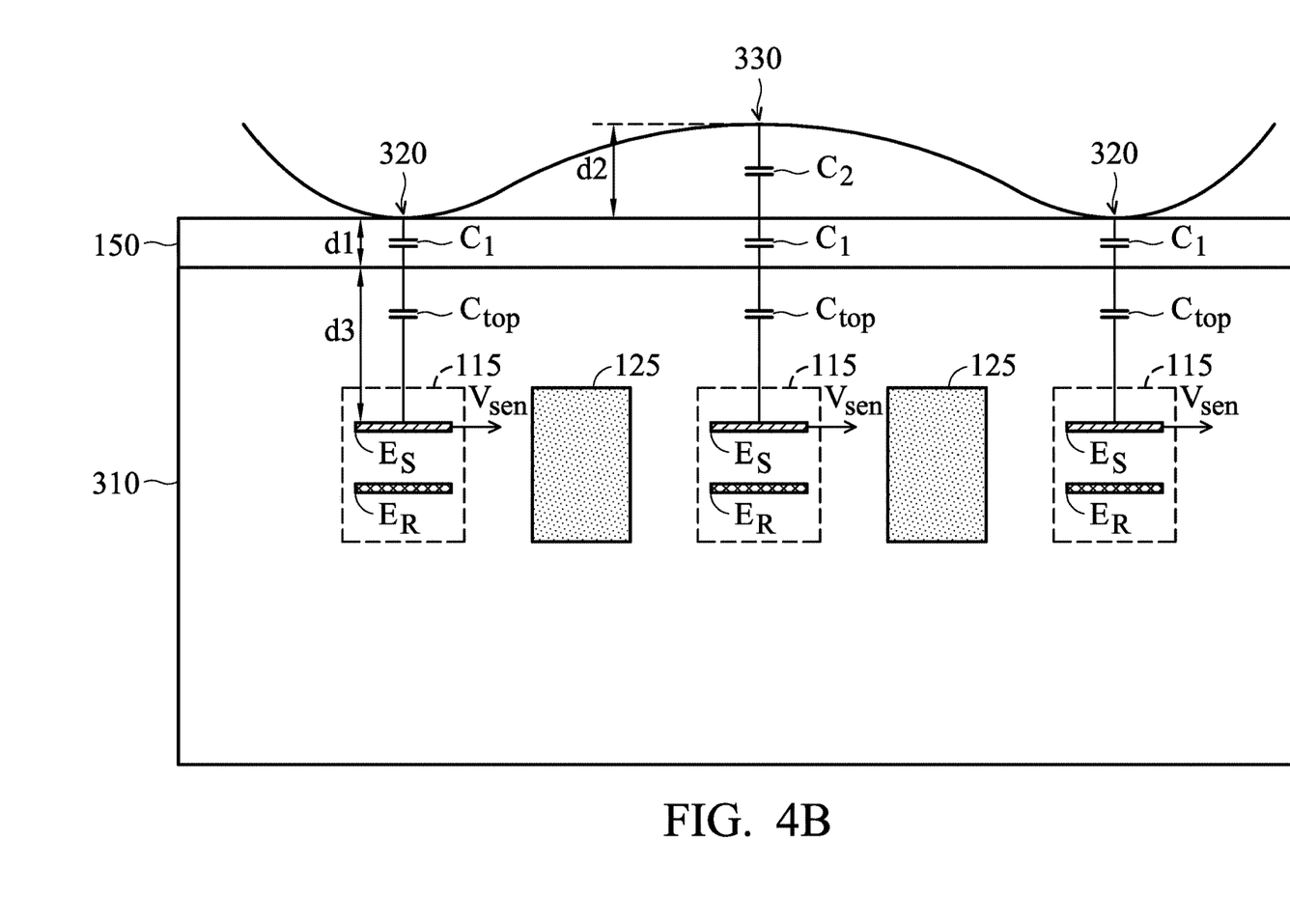
FIG. 4B shows another example of a sectional schematic illustrating the finger of the user contacting the fingerprint sensor of FIG. 2.

Therefore, by disposing the memory units 125 below the sensing units 115, the memory capacity of the fingerprint sensor 100 is increased. Moreover, in cases wherein the same memory capacity is maintained, the layout area of the fingerprint sensor 100 can be decreased by disposing the memory units 125 below the sensing units 115, and then the manufacturing cost is decreased. Furthermore, the memory units 125 also can be disposed in the spaces between the two adjacent sensing units 115 except for disposing the memory units 125 below the sensing units 115. Referring to FIG. 4B, FIG. 4B shows another example of a sectional schematic illustrating the finger of the user contacting the fingerprint sensor 100 of FIG. 2. In FIG. 4B, each memory unit 125 is disposed in the interspace between the two adjacent sensing units 115, wherein size of the interspace and size of the sensing unit 115 can be determined according to actual application.

Figure 5:
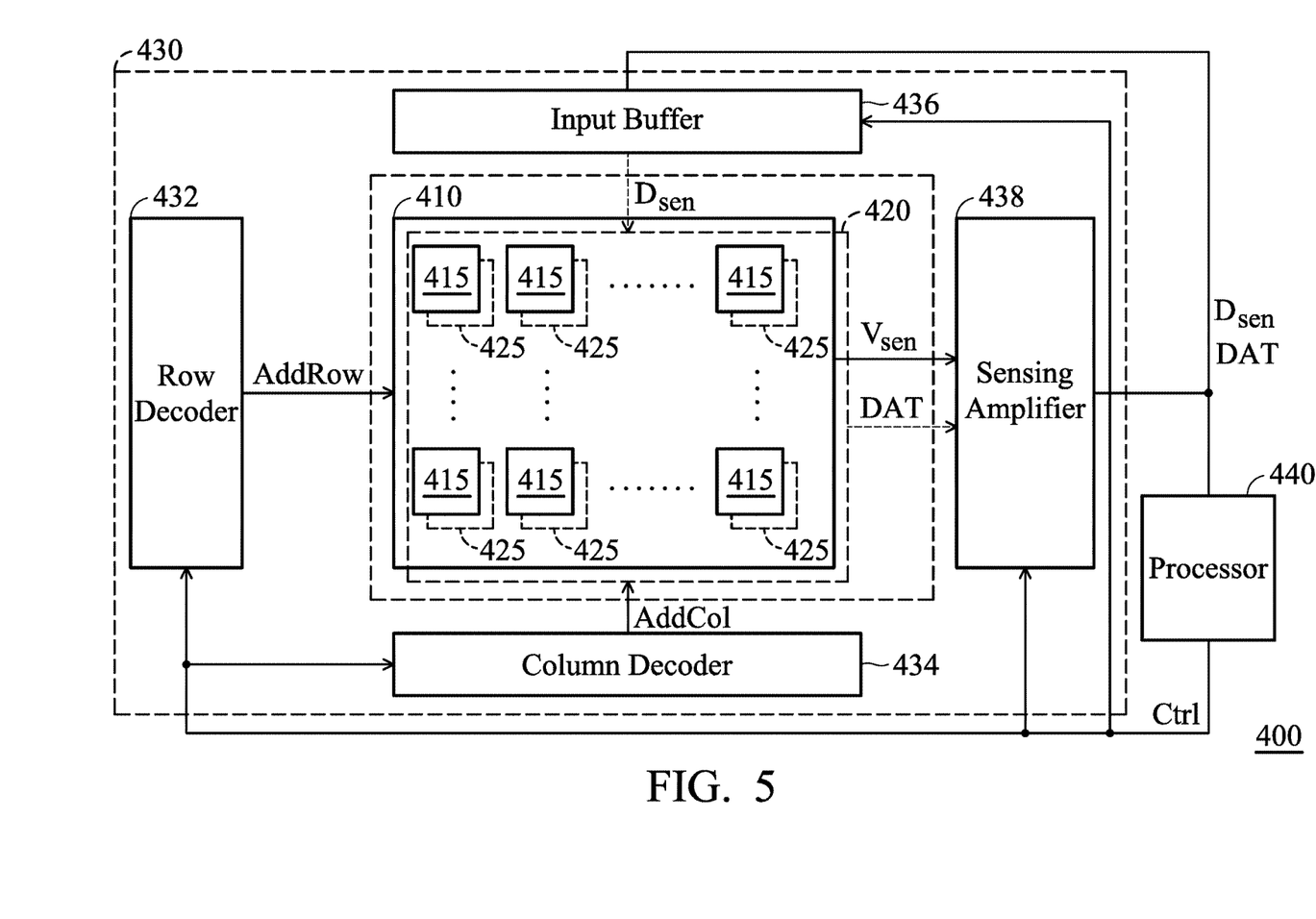
FIG. 5 shows a fingerprint sensor according to another embodiment of the invention.

FIG. 5 shows a fingerprint sensor 400 according to another embodiment of the invention. The fingerprint sensor 400 comprises a sensing array 410, a memory array 420, an access module 430, a processor 440 and an insulating surface (not shown). In the embodiment, the sensing array 410, the memory array 420, the access module 430 and the processor 440 are implemented in a semiconductor substrate (e.g. the semiconductor substrate 310 of FIG. 4A). The sensing array 410 is formed by a plurality of sensing units 415 arranged in a two-dimensional manner. As described above, the insulating surface is disposed on the semiconductor substrate, and overlays the sensing array 410. The memory array 420 is formed by a plurality of memory units 425 arranged in a two-dimensional manner, wherein the memory array 420 is disposed below the sensing array 410 in layout, and each memory unit 425 is disposed below a corresponding sensing unit 415. In one embodiment, each memory unit 425 is capable of storing the data related to the corresponding sensing unit 415. In other embodiments, the memory array 420 further stores the other operation parameters of the fingerprint sensor 400. The access module 430 comprises a row decoder 432, a column decoder 434, an input buffer 436 and a sensing amplifier 438. In the embodiment, the access module 430 selectively reads or writes the sensing array 410 or the memory array 420 according to the control signal Ctrl from the processor 440, wherein the control signal Ctrl comprises information regarding address, access direction and so on. Moreover, the access module 430 also programs the memory array 420 according to the control signal Ctrl. For example, when the control signal Ctrl indicates that the processor 440 will read the sensing voltage $V_{sen}$ of the sensing array 410, the row decoder 432 and the column decoder 434 obtain a row address AddRow and a column address AddCol from the control signal Ctrl, respectively, wherein the sensing unit 415 to be read in the sensing array 410 is addressed by the row address AddRow and the column address AddCol. Next, according to the control signal Ctrl, the sensing amplifier 438 senses the sensing voltage $V_{sen}$ of the sensing unit 415 and provides the sensing output $D_{sen}$ to the processor 440. Next, the processor 440 determines whether a finger of a user contacts the insulating surface according to the received sensing outputs $D_{sen}$ and further obtains fingerprint information of the finger, so as to determine that the sensing output $D_{sen}$ corresponds to a fingerprint ridge or a fingerprint valley of the finger. Furthermore, when the control signal Ctrl indicates that the processor 440 will store the obtained sensing output $D_{sen}$ into the memory array 420, the row decoder 432 and the column decoder 434 obtain a row address AddRow and a column address AddCol from the control signal Ctrl, respectively, wherein the memory unit 425 to be programmed in the memory array 420 is addressed by the row address AddRow and the column address AddCol. Next, according to the control signal Ctrl, the input buffer 436 writes the sensing output $D_{sen}$ into the addressed memory unit 425. Thus, the processor 440 can read the data DAT of the memory array 420 (i.e. the sensing output $D_{sen}$ stored in advance) to generate the fingerprint information. As described above, for each memory unit 425, it can store one or more sensing outputs $D_{sen}$, and the stored sensing output $D_{sen}$ may be the error value Err or the previously obtained sensing output $D_{sen}$, wherein the error value Err represents the sensing voltage $V_{sen}$ of the sensing unit 415 that is obtained by the access module 430 when no object contacts the insulating surface. Moreover, when the control signal Ctrl indicates that the processor 440 will read the data DAT of the memory array 420, the row decoder 432 and the column decoder 434 obtain a row address AddRow and a column address AddCol from the control signal Ctrl, respectively, wherein the memory unit 425 to be read in the memory array 420 is addressed by the row address AddRow and the column address AddCol. Next, according to the control signal Ctrl, the sensing amplifier 438 reads the stored data DAT from the memory unit 425, and provides the data DAT to the processor 440 for subsequent processing.

It should be noted that using a fingerprint sensor to illustrate integrating the memory array into the sensing array is merely an example, and is not meant to limit the invention. The memory architecture described in the embodiments can be implemented in various array sensors, such as a light, capacitance, temperature, pressure, voltage or current sensing device, so as to sense the light/brightness, capacitance, temperature, pressure, voltage or current, and obtains the corresponding sensing value (e.g. a sensing brightness, a sensing capacitance, a sensing temperature, a sensing pressure, a sensing voltage or a sensing current). Thus, according to the sensing value from the sensing array and/or the content stored in the memory array, the processor can obtain a sensing result. Furthermore, in addition to the error value Err and the sensing output $D_{sen}$, the memory array integrated in the sensing array also can be used to store information regarding operations and algorithms performed by the array sensor. According to the embodiments, the array sensor can use a single access module to access the sensing units of the sensing array and the memory units disposed below the sensing units or between the two adjacent sensing units. Thus, the memory capacity of the array sensor is increased, and the layout area of the array sensor is decreased, thereby decreasing the manufacturing cost. Furthermore, by integrating the memory array of the array sensor below or between the sensing units, the layout time of the related signals of the memory array can be sped up, i.e. the occurrence of setup/hold time violations can be decreased, and thus the layout is completed quickly. Moreover, compared with the conventional architecture in which all the memory are disposed around the sensing array, one or all memories that the array sensor needs are disposed below or between the sensing units, thereby decreasing layout area of the array sensor substantially.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An array sensor, comprising:
    a sensing array comprising a plurality of sensing units, wherein each of the sensing units comprises a sensing electrode;
    a memory array comprising a plurality of memory units, wherein each of the memory units is disposed below or adjacent to the corresponding sensing unit and is configured to store sensing data of the corresponding sensing unit;
    an amplifier, comprising two input terminals and one output terminal, wherein one of the input terminals is coupled to the sensing array, the other of the input terminals is coupled to the memory array and the output terminal is coupled to a processor, configured to non-simultaneously access the sensing array and the memory array, wherein for each of the sensing units in the sensing array, the amplifier reads a sensing value of the sensing electrode of the sensing unit from the sensing array and outputs the sensing value to the processor, and reads the sensing data from the corresponding memory unit of the memory array and outputs the sensing data to the processor, wherein the sensing value and the sensing data do not co-exist in the amplifier; and
    the processor, configured to, for each of the sensing units in the sensing array, generate a sensing result according to the sensing value of the sensing electrode of the sensing unit and the sensing data in the corresponding memory unit and produce a fingerprint pattern according to the sensing results.

2. The array sensor as claimed in claim 1, wherein the sensing value represents a sensing voltage, a sensing current, a sensing temperature, a sensing brightness, a sensing capacitance or a sensing pressure.

3. The array sensor as claimed in claim 1, wherein when no object contacts a surface of the sensing array, for each of the sensing units in the sensing array, the processor stores the sensing value of the sensing electrode of the sensing unit into the corresponding memory unit as the sensing data.

4. The array sensor as claimed in claim 3, wherein when an object contacts the surface of the sensing array, for each of the sensing units in the sensing array, the processor obtains the sensing result according to the sensing value of the sensing unit and the sensing data stored in the corresponding memory unit.

5. The array sensor as claimed in claim 3, wherein when an object contacts the surface of the sensing array, for each of the sensing units in the sensing array, the amplifier reads the sensing value of the sensing unit according to a first addressing signal, and provides the sensing value to the processor, and the amplifier reads the sensing data in the memory unit corresponding to the sensing unit according to a second addressing signal, and provides the sensing data to the processor, wherein the processor generates the sensing result according to the sensing value and the corresponding sensing data.

6. The array sensor as claimed in claim 1, wherein the processor stores information regarding an operation or algorithm performed by the array sensor into the memory units, and the information is read by the processor.

7. The array sensor as claimed in claim 1, wherein for each of the sensing units in the sensing array, the processor stores the sensing result corresponding to the sensing unit into the memory unit corresponding to the sensing unit via the amplifier as the sensing data.

8. The array sensor as claimed in claim 1, wherein the array sensor is a fingerprint sensor further comprising:
    an insulating surface disposed on the sensing array.

9. The array sensor as claimed in claim 8, wherein when a finger contacts the insulating surface, a processor controls the amplifier to, for each of the sensing units in the sensing array, store the sensing value of the sensing electrode of the sensing unit into the corresponding memory unit as the sensing data, wherein the processor generates fingerprint information of the finger according to the sensing data stored in the memory units.

10. A sensing method for an array sensor, wherein the array sensor comprises a sensing array comprising a plurality of sensing units, a memory array comprising a plurality of memory units, an amplifier comprising two input terminals and one output terminal and a processor, wherein each of the sensing units comprises a sensing electrode, and each of the memory units is disposed below or adjacent to the corresponding sensing unit, wherein one of the input terminals of the amplifier is coupled to the sensing array, the other of the input terminals of the amplifier is coupled to the memory array and the output terminal of the amplifier is coupled to the processor, and wherein the sensing method comprises:
    non-simultaneously accessing the sensing array and the memory array to, for each of the sensing units in the sensing array, read a sensing value of the sensing electrode of the sensing unit from the sensing array and output the sensing value to the processor by the amplifier, and read the sensing data from the corresponding memory unit of the memory array and output the sensing data to the processor by the amplifier, wherein the sensing value and the sensing data do not co-exist in the amplifier; and
    for each of the sensing units in the sensing array, generating a sensing result according to the sensing value of the sensing electrode of the sensing unit and the sensing data in the corresponding memory unit and producing a fingerprint pattern according to the sensing results by the processor.

11. The sensing method as claimed in claim 10, wherein the sensing value represents a sensing voltage, a sensing current, a sensing temperature, a sensing brightness, a sensing capacitance or a sensing pressure.

12. The sensing method as claimed in claim 10, wherein the step of non-simultaneously accessing the sensing array and the memory array to, for each of the sensing units in the sensing array, read the sensing value of the sensing electrode of the sensing unit from the sensing array and output the sensing value to the processor by the amplifier, and read the sensing data from the corresponding memory unit of the memory array and output the sensing data to the processor by the amplifier further comprises:
    for each of the sensing units in the sensing array, storing the sensing value of the sensing electrode of the sensing unit into the corresponding memory unit as the sensing data by the processor.

13. The sensing method as claimed in claim 12, wherein the step of non-simultaneously accessing the sensing array and the memory array to, for each of the sensing units in the sensing array, read the sensing value of the sensing electrode of each of the sensing unit from the sensing array and output the sensing value to the processor by the amplifier, and read the sensing data from the corresponding memory unit of the memory array and output the sensing data to the processor by the amplifier further comprises:

for each of the sensing units in the sensing array, obtaining the sensing result according to the sensing value of the sensing unit and the sensing data stored in the corresponding memory unit by the processor when an object contacts the surface of the sensing array.

14. The sensing method as claimed in claim 12, wherein the step of non-simultaneously accessing the sensing array and the memory array to, for each of the sensing units in the sensing array, read the sensing value of the sensing electrode of the sensing unit from the sensing array and output the sensing value to the processor by the amplifier, and read the sensing data from the corresponding memory unit of the memory array and output the sensing data to the processor by the amplifier further comprises:

for each of the sensing units in the sensing array, reading the sensing value of the sensing unit from the sensing array by the amplifier according to an addressing signal when an object contacts the surface of the sensing array and providing the sensing value to the processor by the amplifier;

reading the sensing data stored in the memory unit corresponding to the sensing unit by the amplifier according to another addressing signal and providing the sensing data to the processor by the amplifier; and generating the sensing result according to the sensing value and the corresponding sensing data by the processor.

15. The sensing method as claimed in claim 10, further comprising:

storing information regarding an operation or algorithm performed by the array sensor into the memory units by the processor, wherein the information is read by the processor.

16. The sensing method as claimed in claim 10, further comprising:

for each of the sensing units in the sensing array, storing the sensing result corresponding to the sensing unit into the memory unit corresponding to the sensing unit via the amplifier as the sensing data by the processor.

17. The sensing method as claimed in claim 10, wherein the array sensor is a fingerprint sensor, and further comprises:

an insulating surface disposed on the sensing array.

18. The sensing method as claimed in claim 17, wherein the step of non-simultaneously accessing the sensing array and the memory array to, for each of the sensing units in the sensing array, read the sensing value of the sensing electrode of each of the sensing unit from the sensing array and output the sensing value to the processor by the amplifier, and read the sensing data from the corresponding memory unit of the memory array and output the sensing data to the processor by the amplifier further comprises:

for each of the sensing units in the sensing array, controlling the amplifier by the processor to store the sensing value of the sensing electrode of the sensing unit into the corresponding memory unit as the sensing data when a finger contacts the insulating surface; and generating fingerprint information of the finger according to all of the sensing data stored in the memory units by the processor.

* * * * *